(12) United States Patent
Park et al.

(10) Patent No.: US 11,113,160 B2
(45) Date of Patent: Sep. 7, 2021

(54) APPARATUS FOR MIGRATING DATA AND METHOD OF OPERATING SAME

(71) Applicant: KOREA INSTITUTE OF SCIENCE & TECHNOLOGY INFORMATION, Daejeon (KR)

(72) Inventors: Geunchul Park, Daejeon (KR); Jieun Choi, Daejeon (KR); Chan-Yeol Park, Daejeon (KR); Seungwoo Rho, Daejeon (KR); Jong Min Lee, Daejeon (KR); Kwangho Lee, Daejeon (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 91 days.

(21) Appl. No.: 16/665,936

(22) Filed: Oct. 28, 2019

(65) Prior Publication Data

US 2021/0089414 A1    Mar. 25, 2021

(30) Foreign Application Priority Data

Sep. 19, 2019 (KR) ........................ 10-2019-0115565

(51) Int. Cl.
*G06F 11/00* (2006.01)
*G06F 11/20* (2006.01)
*G06F 7/483* (2006.01)
*G06F 9/48* (2006.01)
*G06F 11/07* (2006.01)
*G06F 11/30* (2006.01)
*G06F 12/0882* (2016.01)

(52) U.S. Cl.
CPC ............ *G06F 11/203* (2013.01); *G06F 7/483* (2013.01); *G06F 9/4856* (2013.01); *G06F 11/073* (2013.01); *G06F 11/076* (2013.01); *G06F 11/3037* (2013.01); *G06F 12/0882* (2013.01)

(58) Field of Classification Search
CPC ...... G06F 7/483; G06F 9/4856; G06F 11/073; G06F 11/076; G06F 11/203; G06F 11/3037; G06F 12/0882
See application file for complete search history.

(56) References Cited

U.S. PATENT DOCUMENTS

| | | | | |
|---|---|---|---|---|
| 8,402,229 B1 * | 3/2013 | Wilt | ........................ | G09G 5/001 |
| | | | | 711/152 |
| 8,539,516 B1 * | 9/2013 | Wilt | ........................ | G06F 9/526 |
| | | | | 719/323 |

(Continued)

FOREIGN PATENT DOCUMENTS

KR    10-2019-0067938 A    6/2019

OTHER PUBLICATIONS

Korean Intellectual Property Office, Notification of Reason for Refusal, Korean Patent Application No. 10-2019-0115565, dated Jan. 22, 2020, eight pages.

(Continued)

*Primary Examiner* — Joshua P Lottich
(74) *Attorney, Agent, or Firm* — Fenwick & West LLP

(57) ABSTRACT

Disclosed are an apparatus for performing data migration and a method of operating the same for processing data migration between memories according to a monitoring result of a change in performance while applications are executed in a High Performance Computing (HPC) environment adapting hybrid memories.

16 Claims, 6 Drawing Sheets

(56) References Cited

U.S. PATENT DOCUMENTS

| | | | | |
|---|---|---|---|---|
| 8,755,515 B1* | 6/2014 | Wu | ............... | H04M 5/00 |
| | | | | 379/284 |
| 2009/0154690 A1* | 6/2009 | Wu | ............... | H04M 19/02 |
| | | | | 379/386 |
| 2011/0137612 A1* | 6/2011 | Wang | ............... | G01R 33/50 |
| | | | | 702/181 |
| 2017/0188412 A1* | 6/2017 | Noriega | ............... | H04W 88/08 |
| 2017/0270424 A1* | 9/2017 | Sankaralingam | ............... | G06F 8/75 |
| 2018/0189065 A1* | 7/2018 | Raman | ............... | G06F 9/30065 |

OTHER PUBLICATIONS

Lee, J. et al., "HyDM: Data Migration Methodology for Hybrid Memories targeting Intel Knights Landing Processor," International Journal of Design, Analysis and Tools for Integrated Circuits and Systems, Oct. 2018, pp. 88-93, vol. 7, No. 1.

Lee, J. et al., "Research on Analytics with System Profiling Data," Wonkwang University, Oct. 31, 2018, 78 pages (with English summary).

\* cited by examiner

APPARATUS FOR MIGRATING DATA AND METHOD OF OPERATING SAME

CROSS-REFERENCE TO RELATED APPLICATION

This application claims priority to Republic of Korea Patent Application No. 10-2019-0115565 filed on Sep. 19, 2019, which is incorporated by reference herein in its entirety.

BACKGROUND OF THE INVENTION

1. Field of the Invention

The present disclosure relates to a technology for processing migration of data between memories according to a monitoring result of a change in performance during execution of an application in a High Performance Computing (HPC) environment using hybrid memories.

2. Description of the Prior Art

With the development of process technology and the increase in performance required by an application, current processors may integrate a plurality of cores into one chip.

The development of the technology has introduced a many-core processor including dozens to hundreds of cores in one chip, and results in constructing a High Performance Computing (HPC) system capable of simultaneously executing a plurality of applications by the processor.

The high performance computing system is required to provide a high computing arithmetic capability and a high capacity memory, and thus adapts hybrid memories corresponding to a heterogeneous memory system to increase memory bandwidth.

However, the hybrid memory adapted by the high performance computing system has different characteristics such as different access time, different delay time, and different capacities between different types of memories and needs to define a data migration policy between memories in order to efficiently use the hybrid memory.

SUMMARY OF THE INVENTION

The present disclosure has been mode to solve the problems, and an aspect of the present disclosure is to process data migration between memories according to a monitoring result of a change in performance while applications are executed in a High Performance Computing (HPC) environment adapting hybrid memories.

In accordance with an aspect of the present disclosure, an apparatus for performing data migration is provided. The apparatus includes: a monitoring unit configured to monitor a change in performance of each application while each application is executed; a calculation unit configured to calculate an arithmetic intensity of each application, based on a monitoring result; and a selection unit configured to select a specific application predicted to have a smallest number of computing arithmetic requests compared to memory access requests as a target application for memory migration, based on the arithmetic intensity.

Specifically, the apparatus may further include a processing unit configured to process migration of data of the specific application selected as the target application from a first memory corresponding to a low bandwidth memory to a second memory corresponding to a high bandwidth memory.

Specifically, the monitoring unit may be configured to monitor a change in performance of each application according to at least one of a floating point arithmetic operation, page reference information, and page fault information, collected from monitoring data of each application.

Specifically, the calculation unit may be configured to calculate the arithmetic intensity indicating a ratio between a floating point arithmetic amount and a data movement amount, based on the floating point arithmetic operation and the page reference information for each application and calculate the arithmetic intensity to be smaller as a ratio of the data movement amount to the floating point arithmetic amount is higher.

Specifically, the selection unit may be configured to predict an arithmetic intensity of a next neighboring period by performing linear regression on an arithmetic intensity calculated for each application in every period and select a specific application predicted to have a smallest arithmetic intensity of the next neighboring period as a target application.

Specifically, the selection unit may be configured to determine locality of the specific application by comparing a page fault value of the specific application with an average page fault value of the remaining applications and, when the page fault value of the specific application is larger than or equal to the average page fault of the remaining applications, select the specific application as the target application.

Specifically, the processing unit may be configured to, when a use rate of the second memory including a use rate of the specific application corresponding to the target application is equal to or smaller than a threshold value, perform migration of data of the specific application to the second memory.

Specifically, the processing unit may be configured to, when a use rate of the second memory including a use rate of the specific application corresponding to the target application is larger than a threshold value, identify floating point arithmetic performance of each application migrating to the second memory and, when there is an application having lower performance than floating point arithmetic performance in the first memory, return data of the corresponding application to the first memory.

In accordance with another aspect of the present disclosure, a method of operating a data migration device is provided. The method includes: a monitoring step of monitoring a change in performance of each application while each application is executed; a calculation step of calculating an arithmetic intensity of each application, based on a monitoring result; and a selection step of selecting a specific application predicted to have a smallest number of computing arithmetic requests compared to memory access requests as a target application for memory migration, based on the arithmetic intensity.

Specifically, the method may further include a processing step of processing migration of data of the specific application selected as the target application from a first memory corresponding to a low bandwidth memory to a second memory corresponding to a high bandwidth memory.

Specifically, the monitoring step may include monitoring a change in performance of each application according to at least one of a floating point arithmetic operation, page reference information, and page fault information, collected from monitoring data of each application.

Specifically, the calculation step may include calculating the arithmetic intensity indicating a ratio between a floating point arithmetic amount and a data movement amount, based on the floating point arithmetic operation and the page reference information for each application and calculating the arithmetic intensity to be smaller as a ratio of the data movement amount to the floating point arithmetic amount is higher.

Specifically, the selection step may include predicting an arithmetic intensity of a next neighboring period by performing linear regression on an arithmetic intensity calculated for each application in every period and selecting a specific application predicted to have a smallest arithmetic intensity of the next neighboring period as the target application.

Specifically, the selection step may include determining locality of the specific application by comparing a page fault value of the specific application with an average page fault value of the remaining applications and, when the page fault value of the specific application is larger than or equal to the average page fault of the remaining applications, selecting the specific application as the target application.

Specifically, the processing step may include, when a use rate of the second memory including a use rate of the specific application corresponding to the target application is equal to or smaller than a threshold value, performing migration of data of the specific application to the second memory.

Specifically, the processing step may include: when a use rate of the second memory including a use rate of the specific application corresponding to the target to migrate between memories is larger than a threshold value, identifying floating point arithmetic performance of each application migrating to the second memory and, when there is an application having lower performance than floating point arithmetic performance in the first memory, returning data of the corresponding application to the first memory.

Accordingly, an apparatus for performing data migration and a method of operating the same according to the present disclosure can efficiently use hybrid memories by defining a data migration policy for processing data migration between memories according to a monitoring result of a change in performance while applications are executed in a High Performance Computing (HPC) environment adapting hybrid memories.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
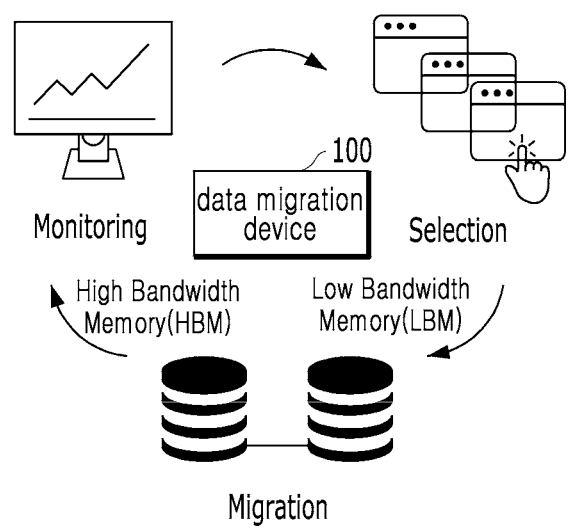
FIG. 1 is a block diagram schematically illustrating a patent life span prediction environment according to an embodiment of the present disclosure.

FIG. 1 schematically illustrates a high performance computing environment according to an embodiment of the present disclosure.

As illustrated in FIG. 1, the high performance computing environment according to an embodiment of the present disclosure may include a data migration device 100 configured to process data migration between memories.

The data migration device 100 is a device for processing data migration between memories in a High Performance Computing (HPC) environment, and may be implemented in the form of a server accessible through a wired/wireless communication network or in the form of a program within a computer system (for example, a computer or a mobile phone).

When the data migration device 100 is implemented in the form of a server, the data migration device may be implemented in the form of, for example, a web server, a database server, or a proxy server, or may be implemented as a computerized system through installation of one or more of various pieces of software that allow a network load distribution mechanism or the service device to operate over the Internet or another network. Further, the network may be an http network, a private line, an intranet, or another network, and a connection between elements within the system according to an embodiment of the present disclosure may be made through a security network to prevent data from being compromised by an arbitrary hacker or another third party.

Meanwhile, the high performance computing system is required to provide a high computing arithmetic capability and a high capacity memory, and thus adapts hybrid memories corresponding to a heterogeneous memory system to increase a memory bandwidth.

However, the hybrid memories adapted by the high performance computing system has different characteristics such as different access time, different delay time, and different capacities between different types of memories and needs to define a data migration policy between memories in order to efficiently use the hybrid memories An embodiment of the present disclosure processes data migration between memories according to a monitoring result of a change in performance while applications are executed in a High Performance Computing (HPC) environment adapting hybrid memories and, hereinafter, describes in more detail the configuration of the data migration device 100 for implementing the same.

Meanwhile, hereinafter, it is premised that the hybrid memory according to an embodiment of the present disclosure includes a Low Bandwidth Memory (LBM) (hereinafter, referred to as a "first memory") and a High Bandwidth Memory (HBM) (hereinafter, referred to as a "second memory").

Figure 2:
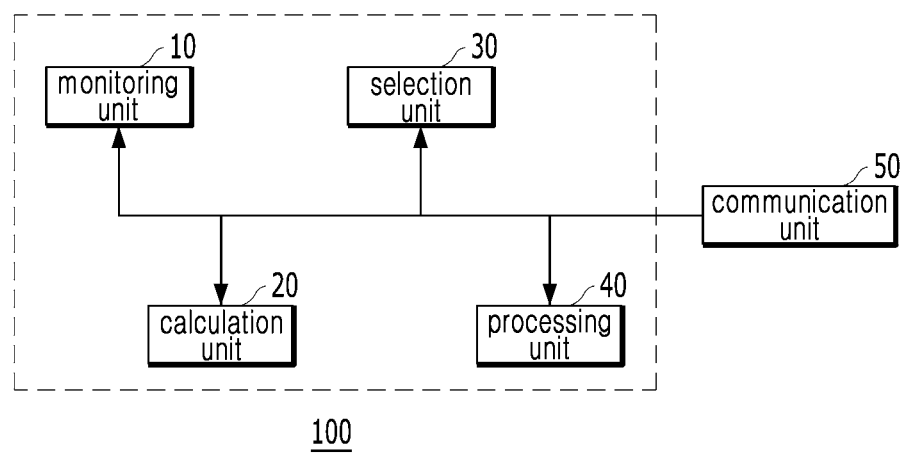
FIG. 2 is a block diagram illustrating the configuration of data migration device according to an embodiment of the present disclosure.

FIG. 2 illustrates the configuration of the data migration device 100 according to an embodiment of the present disclosure.

As illustrated in FIG. 2, the data migration device 100 according to an embodiment of the present disclosure may include a monitoring unit 10 configured to monitor a change in performance during execution of an application, a calculation unit 20 configured to calculate an arithmetic intensity of each application, and a selection unit 30 configured to select an application to migrate between memories.

Further, the data migration device 100 according to an embodiment of the present disclosure may further include a processing unit 40 configured to process data migration as well as the above-described elements.

All or at least some of the elements of the data migration device 100 including the monitoring unit 10, the calculation unit 20, the selection unit 30, and the processing unit 40 may be implemented in the form of a hardware module, a software module, or a combination of a hardware module and a software module.

The software module may be understood as, for example, instructions executed by the processor that controls arithmetic within the data migration device 100, and the instructions may have the form of being installed in a memory within the data migration device 100.

Meanwhile, the data migration device 100 according to an embodiment of the present disclosure may further include a communication unit 50 which is an RF module performing a communication function for supporting wired/wireless communication network access as well as the above-described elements.

The communication unit 50 may include, for example, an antenna system, an RF transceiver, one or more amplifiers, a tuner, one or more oscillators, a digital signal processor, a CODEC chipset, and a memory, but is not limited thereto, and may include all known circuits for performing the function.

The data migration device 100 according to an embodiment of the present disclosure may process data migration between memories according to a monitoring result of a change in performance during execution of an application through the above-described elements, and hereinafter each element within the data migration device 100 for implementing the same will be described in more detail.

The monitoring unit 10 performs a function of monitoring a change in performance while an application is executed.

More specifically, the monitoring unit 10 periodically monitors a change of performance while applications are executed in the system through a monitoring tool.

At this time, the monitoring unit 10 may monitor a change in performance of each application on the basis of a floating point arithmetic operation, page reference information, and page fault information, collected from monitoring data of each application.

Meanwhile, the aforementioned monitoring process according to an embodiment of the present disclosure may be implemented through, for example, the following algorithm.

For reference, the algorithm corresponds to an embodiment of a hybrid memory system including an LBM as a first memory which is a low bandwidth memory and an HBM as a second memory which is a high bandwidth memory.

```
Input: L ← the list of running application
       W ← the list of windows for monitoring data
/*
M : the list of monitoring data for applications
i : the index of application
*/
for i ← L₀ to length(L) do
    1. Mᵢ ← get MonitoringData(i)
    2.      /* Mᵢ.fp : # of floating point operations */
    3.      /* Mᵢ.pref : # of page references */
    4.      /* Mᵢ.pf : # of page faults */
end for
5. insert M to W₀
```

According to the algorithm for monitoring according to an embodiment of the present disclosure, a list L of an executed application and a window list W for monitoring data are input.

A list of monitored data of currently executed applications is indicated as M, and monitoring data of an $i^{th}$ application is indicated as Mi.

Figure 3:
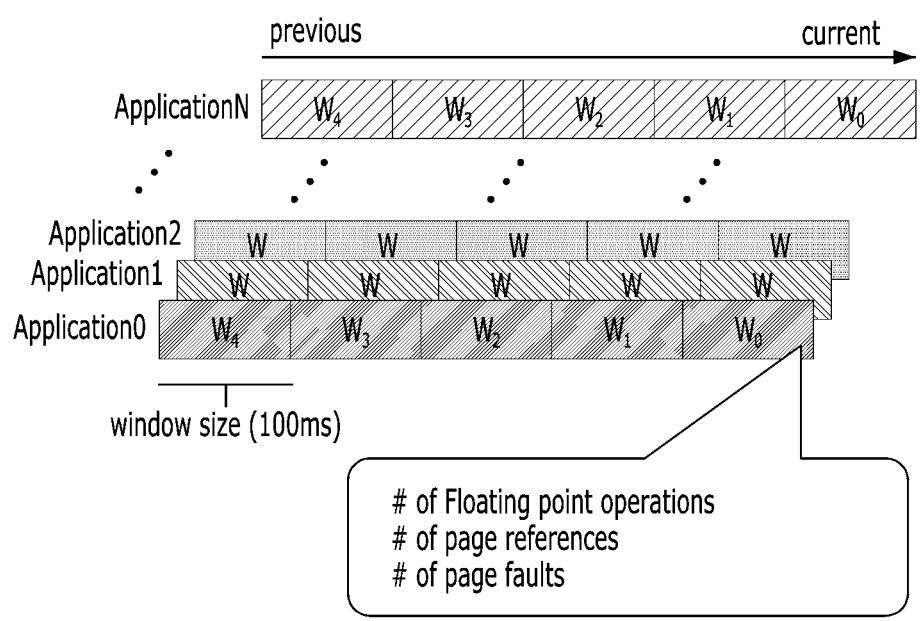
FIG. 3 illustrates a window list according to an embodiment of the present disclosure.

In connection with this, FIG. 3 illustrates the window list W for monitoring data by way of example.

The floating point arithmetic operations, the page reference information, and the page fault information are collected through the monitoring work, Mi.fp and Mi.pref are used to calculate an arithmetic intensity.

For repetitive statement stops when i is the same as the size of the list L, and W0 is inserted into M for the next step.

The calculation unit 20 performs a function of calculating an arithmetic intensity of each application.

More specifically, the calculation unit 20 calculates the arithmetic intensity of each application on the basis of the monitoring result of the change in performance while each application is executed.

At this time, the calculation unit 20 may calculate the arithmetic intensity indicating a ratio between a floating point arithmetic amount and a data movement amount on the basis of the floating point arithmetic operation and the page reference information of each application and calculate the arithmetic intensity to be lower as the ratio of the data movement to the floating point arithmetic operation is higher.

The small arithmetic intensity means that the number of computing arithmetic requests is small compared to the number of memory access requests.

The selection unit 30 performs a function of selecting an application corresponding to a target to migrate between memories.

More specifically, when the arithmetic intensity of each application is calculated, the selection unit 30 selects, as a target to migrate between memories, a specific application predicted to have the smallest number of computing arithmetic requests compared to the number of memory access requests on the basis of the arithmetic intensity calculation result.

That is, the selection unit 30 may select the specific application having the smallest arithmetic intensity as the target to migrate between memories on the basis of the arithmetic intensity calculation result of each application.

At this time, the selection unit 30 may predict an arithmetic intensity of the next neighboring period by performing linear regression on the arithmetic intensity calculated for each application in every period and select a specific application predicted to have the smallest arithmetic intensity in the next neighboring period as a target to migrate between memories on the basis of the prediction result.

However, when selecting the target to migrate between memories, the selection unit 30 compares a page fault value of a candidate application predicted to have the smallest arithmetic intensity and determines locality of the candidate application, and when the page fault value of the candidate application is equal to or larger than an average page fault of the remaining applications in such a process, selects the candidate application as the target to migrate between memories.

Meanwhile, the process of selecting the target to migrate between memories according to an embodiment of the present disclosure may be implemented through, for example, the following algorithm.

```
Input: L ← the list of running application
       W ← the list of windows for monitoring data
Output: b ← the selected application id
/*
S : the sorted list of applications
V : the miss predicted list of applications
i : the index of applications
pf_avg : the averaged page faults
*/
1. S ← regressionAndSort(W)
2. pf_avg ← getAvgPageFault(W_0)
for i ← 0 to length(S) do
    3. if S_i in V then continue
    4. if S_i.pf > pf_avg then continue
    5. b ← getAppId(S_i, L)
    6. return b
end for
```

Figure 4:
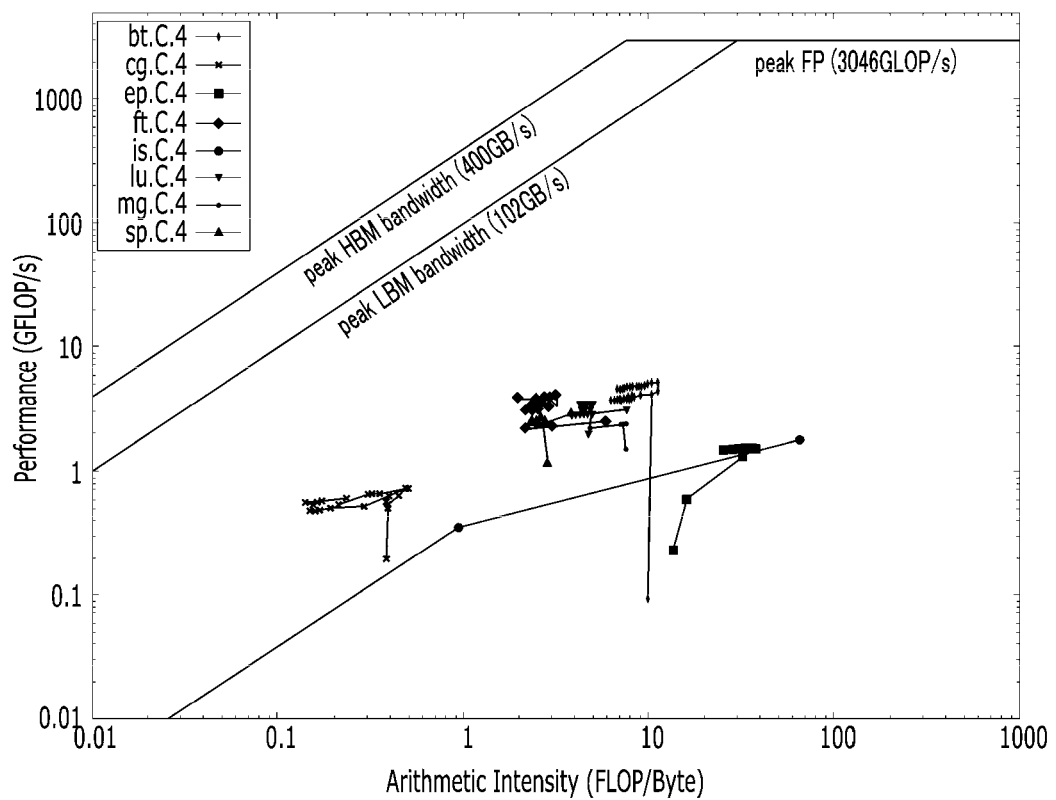
FIG. 4 illustrates a Roofline model according to an embodiment of the present disclosure.

According to the algorithm for selecting the target to migrate between memories according to an embodiment of the present disclosure, for example, a Roofline model is used to select the target to migrate between memories, and an application having the lowest arithmetic intensity on the memory upper limit when an application execution state is drawn in the Roofline model as illustrated in FIG. 4.

This strategy may be understood to give more opportunities to an application having a higher memory reference rate compared to the calculation arithmetic amount.

The regressionAndSort work first calculates the arithmetic intensity of each application using the floating point arithmetic and the page reference stored in the list W.

Thereafter, the next arithmetic intensity of each application is predicted by performing linear regression.

Lastly, an application list S is arranged in ascending order according to the predicted arithmetic intensity value.

After all candidate applications are arranged in the list S, a first application in the list is considered as the target to migrate between memories.

First, it is identified whether there is a record (V) of mistake of prediction of candidate applications. The list V is generated when there is no performance improvement after the application migrates during the migration work.

Further, a page fault value is used to exclude an application indicating low memory locality, and a page fault value of the first application is compared with an average page fault value of the applications.

When all work is finished, a candidate application b is returned to migrate.

The processing unit 40 performs a function of processing data migration between memories.

More specifically, when the target to migrate between memories is selected, the processing unit 40 processes migration of data of a specific application selected as the target to migrate between memories from a first memory corresponding to a low bandwidth memory to a second memory corresponding to a high bandwidth memory.

At this time, the processing unit 40 may migrate the data of the specific application to the second memory only when a use rate of the second memory including a use rate of the specific application which is the target to migrate between memories is equal to or smaller than a threshold value.

On the other hand, when the use rate of the second memory including the use rate of the specific application which is the target to migrate between memories is larger than the threshold value, the processing unit 40 identifies floating point arithmetic performance of each application migrating to the second memory, and when there is an application having performance lower than floating point arithmetic performed in the first memory, return data of the corresponding application to the first memory.

Meanwhile, the process of performing data migration according to an embodiment of the present disclosure may be implemented through, for example, the following algorithm.

```
Input: b ← the selected application id
       L ← the list of running application
       W ← the list of windows for monitoring data
/*
V : the list of miss predicted applications
r : the index of application for rollback
t : the threshold ratio of HBM use
*/
if isMigrationPossible(t, b) then
    1. migrationToHBM(b, W)
else
    2. r ← checkFlops(W)
    3. if r exists then
    4.     insert r to V
    5.     migrationToLBM(r, W)
    6. end if
end if
```

According to the algorithm for processing data migration according to an embodiment of the present disclosure, a use rate of all memories including a use rate of the current memory of the application selected as the target to migrate between memories is identified and whether the use rate exceeds a threshold value t (for example, corresponding to 90% of all memories) is identified.

At this time, when the use rate of the second memory (HBM) is smaller than the threshold value t, a page referenced during the window list W in the selected application migrates to the second memory (HBM).

Figure 5:
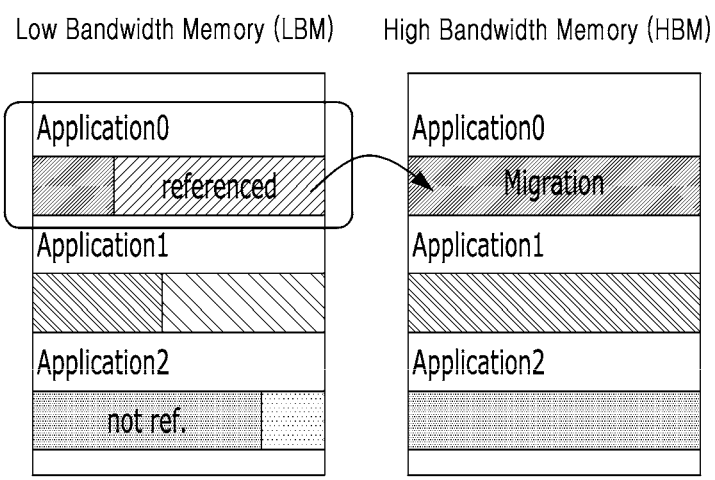
FIG. 5 illustrates page migration according to an embodiment of the present disclosure.

In connection with this, FIG. 5 illustrates migration of a referenced page of an application by way of example.

When the use rate of the second memory (HBM) is larger than the threshold value t, a change in floating point arithmetic performance of applications having already migrated to the second memory (HBM) is identified.

When the floating point arithmetic performance of the application is larger than the previous floating point arithmetic performance at least once, the corresponding application continuously remains in the second memory (HBM).

This is to apply a strict rollback method since frequency page migration causes additional overhead in an aspect of the performance or energy.

When an application having no change in floating point arithmetic performance is found, checkFlops returns id r of the application. Then, the corresponding application is added to the list v in order to record misprediction and pages of the application migrate again to the first memory (LBM).

As described above, according to the configuration of the data migration device 100 according to an embodiment of the present disclosure, it is possible to efficiently use hybrid memories by performing periodic monitoring using a hardware monitoring tool while applications are executed in a High Performance Computing (HPC) environment having hybrid memories, selecting candidate applications requiring more memory bandwidths using a Roofline model on the basis of collected data, and defining a data migration policy between memories for performing dynamic migration of data between a high bandwidth memory and a low bandwidth memory.

Figure 6:
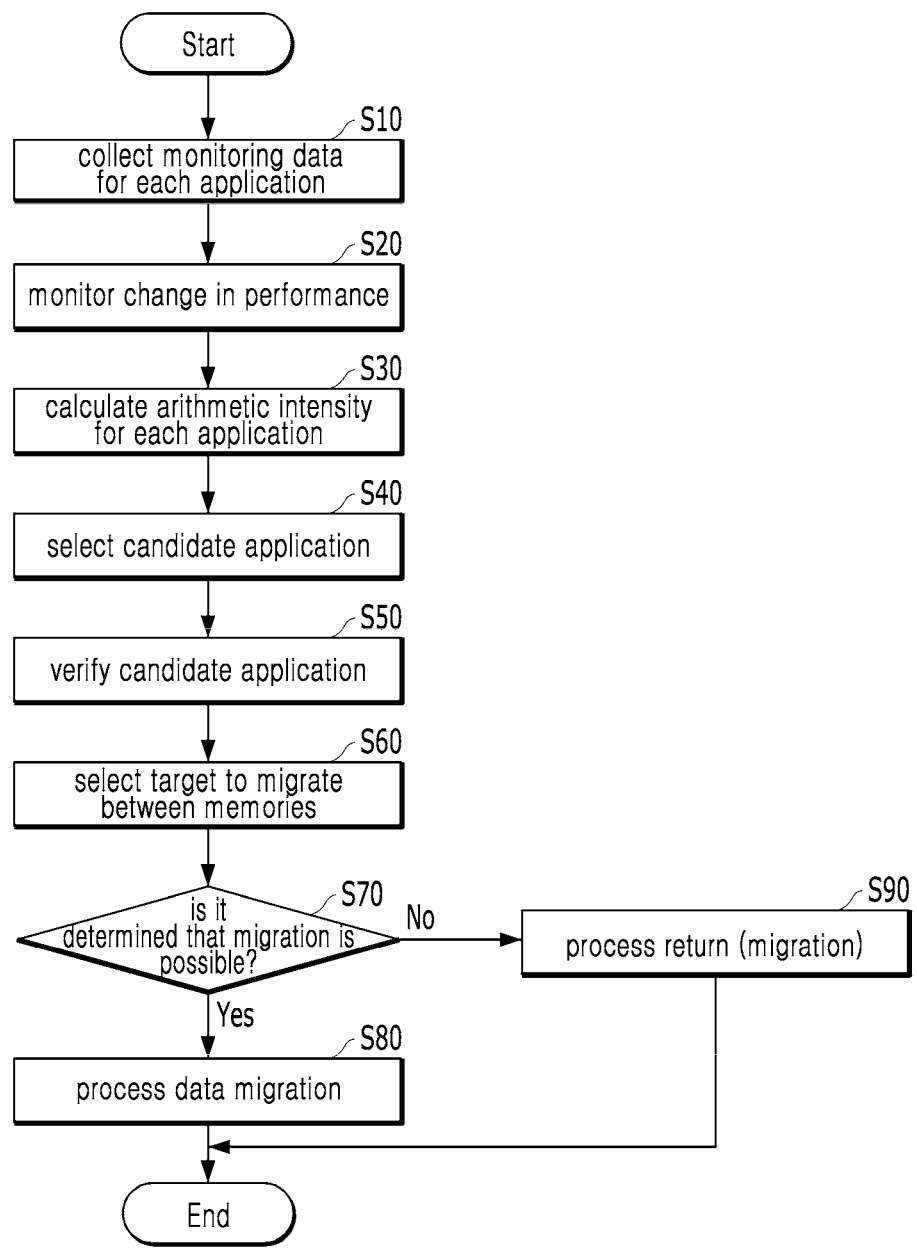
FIG. 6 is a flowchart schematically illustrating a method of operating the data migration device according to an embodiment of the present disclosure.

Hereinafter, a method of operating the data migration device 100 will be described with reference to FIG. 6.

First, the monitoring unit 10 periodically monitors a change in performance while applications are executed in the system using a hardware monitoring tool in S10 to S20.

At this time, the monitoring unit 10 may monitor a change in performance of each application on the basis of a floating point arithmetic operation, page reference information, and page fault information, collected from monitoring data of each application.

Subsequently, the calculation unit 20 calculates the arithmetic intensity of each application on the basis of the monitoring result of the change in performance while each application is executed in S30.

At this time, the calculation unit 20 may calculate the arithmetic intensity indicating a ratio between the floating point arithmetic amount and data movement on the basis of the floating point arithmetic operation and the page reference information of each application and calculate the arithmetic intensity to be lower as the ratio of the data movement to the floating point arithmetic operation is higher.

The small arithmetic intensity means that the number of computing arithmetic requests is small compared to the number of memory access requests.

When the arithmetic intensity of each application is calculated, the selection unit 30 selects a specific application predicted to have the smallest number of computing arithmetic requests compared to memory access requests as a target to migrate between memories on the basis of the arithmetic intensity calculation result in S40 to S60.

That is, the selection unit 30 may select the specific application having the smallest arithmetic intensity as the target to migrate between memories on the basis of the arithmetic intensity calculation result of each application.

At this time, the selection unit 30 may predict the arithmetic intensity of the next neighboring period by performing linear regression on the arithmetic intensity calculated for each application in every period and select a specific application predicted to have the smallest arithmetic intensity of the next neighboring period as the target to migrate between memories on the basis of the prediction result.

However, when selecting the target to migrate between memories, the selection unit 30 compares a page fault value of a candidate application predicted to have the smallest arithmetic intensity and determines locality of the candidate application, and when the page fault value of the candidate application is equal to or larger than an average page fault of the remaining applications in such a process, selects the candidate application as the target to migrate between memories.

Thereafter, when the target to migrate between memories is selected, the processing unit 40 processes migration of data of the specific application selected as the target to migrate between memories from a first memory corresponding to a low bandwidth memory to a second memory corresponding to a high bandwidth memory in S70 to S80.

At this time, the processing unit 40 may migrate the data of the specific application to the second memory only when a use rate of the second memory including a use rate of the specific application which is the target to migrate between memories is equal to or smaller than a threshold value.

Meanwhile, when it is identified that the use rate of the second memory including the use rate of the specific application which is the target to migrate between memories exceeds a threshold value in S70, the processing unit 40 may identify floating point arithmetic performance of each application migrating to the second memory and, when there is an application having smaller performance than the floating point arithmetic performance in the first memory on the basis of the identification result, return data of the corresponding application to the first memory in S90.

As described above, according to the method of operating the data migration device 100 according to an embodiment of the present disclosure, it is possible to efficiently use hybrid memories by performing periodic monitoring using a hardware monitoring tool while applications are executed in a High Performance Computing (HPC) environment having hybrid memories, selecting candidate applications requiring more memory bandwidths using a Roofline model on the basis of collected data, and defining a data migration policy between memories for performing dynamic migration of data between a high bandwidth memory and a low bandwidth memory.

Meanwhile, the method described in connection with the provided embodiments or steps of the algorithm may be implemented in a form of a program command, which can be executed through various computer means, and recorded in a computer-readable recording medium. The computer readable medium may include a program command, a data file, a data structure, and the like independently or in combination. The program command recorded in the medium may be things specially designed and configured for the present disclosure, or things that are well known to and can be used by those skilled in the computer software related art.

Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

The present disclosure, pertaining to an apparatus for performing data migration and a method of operating the same, has industrial applicability since the technology is relevant and useful in that the present disclosure overcomes the limit of the prior art, the applied device is sufficient to be brought to market and sold, and it is obvious that the applied device is practicably realized in that data migration between memories can be processed according to a monitoring result of a change in performance while applications are executed in a High Performance Computing (HPC) environment adapting hybrid memories.

What is claimed is:

1. An apparatus for performing data migration, the apparatus comprising:
    a processor; and
    a memory storing instructions thereon, the instructions when executed by the processor cause the processor to:
        monitor a change in performance of each application while each application is executed;

calculate an arithmetic intensity of each application, based on a monitoring result; and select a specific application predicted to have a smallest number of computing arithmetic requests compared to memory access requests as a target application for memory migration, based on the arithmetic intensity.

2. The apparatus of claim 1, wherein the instructions further cause the processor to process migration of data of the specific application selected as the target application from a first memory corresponding to a low bandwidth memory to a second memory corresponding to a high bandwidth memory.

3. The apparatus of claim 2, wherein the instructions further cause the processor to, when a use rate of the second memory including a use rate of the specific application is equal to or smaller than a threshold value, perform migration of data of the specific application to the second memory.

4. The apparatus of claim 2, wherein the instructions further cause the processor to identify floating point arithmetic performance of each application migrating to the second memory when a use rate of the second memory including a use rate of the specific application is larger than a threshold value, and when there is an application having lower performance than floating point arithmetic performance in the first memory, return data of the corresponding application to the first memory.

5. The apparatus of claim 1, wherein the instructions further cause the processor to monitor a change in performance of each application according to at least one of a floating point arithmetic operation, page reference information, and page fault information, collected from monitoring data of each application.

6. The apparatus of claim 5, wherein the instructions further cause the processor to calculate the arithmetic intensity indicating a ratio between a floating point arithmetic amount and a data movement amount based on the floating point arithmetic operation and the page reference information for each application and calculate the arithmetic intensity to be smaller as a ratio of the data movement amount to the floating point arithmetic amount is higher.

7. The apparatus of claim 5, wherein the instructions further cause the processor to determine locality of the specific application by comparing a page fault value of the specific application with an average page fault value of the remaining applications and, when the page fault value of the specific application is larger than or equal to the average page fault of the remaining applications, select the specific application as the target application.

8. The apparatus of claim 1, wherein the instructions further cause the processor to predict an arithmetic intensity of a next neighboring period by performing linear regression on an arithmetic intensity calculated for each application in every period and select a specific application predicted to have a smallest arithmetic intensity of the next neighboring period as the target application.

9. A method of operating a data migration device, the method comprising:

a monitoring step of monitoring a change in performance of each application while each application is executed;

a calculation step of calculating an arithmetic intensity of each application, based on a monitoring result; and a selection step of selecting a specific application predicted to have a smallest number of computing arithmetic requests compared to memory access requests as a target application for memory migration based on the arithmetic intensity.

10. The method of claim 9, further comprising a processing step of processing migration of data of the specific application selected as the target application from a first memory corresponding to a low bandwidth memory to a second memory corresponding to a high bandwidth memory.

11. The method of claim 10, wherein, when a use rate of the second memory including a use rate of the specific application is equal to or smaller than a threshold value, the processing step comprises performing migration of data of the specific application to the second memory.

12. The method of claim 10, wherein, when a use rate of the second memory including a use rate of the specific application corresponding to the target to migrate between memories is larger than a threshold value, the processing step comprises identifying floating point arithmetic performance of each application migrating to the second memory and, when there is an application having lower performance than floating point arithmetic performance in the first memory, returning data of the corresponding application to the first memory.

13. The method of claim 9, wherein the monitoring step comprises monitoring a change in performance of each application according to at least one of a floating point arithmetic operation, page reference information, and page fault information, collected from monitoring data of each application.

14. The method of claim 13, wherein the calculation step comprises calculating the arithmetic intensity indicating a ratio between a floating point arithmetic amount and a data movement amount, based on the floating point arithmetic operation and the page reference information for each application and calculating the arithmetic intensity to be smaller as a ratio of the data movement amount to the floating point arithmetic amount is higher.

15. The method of claim 13, wherein the selection step comprises determining locality of the specific application by comparing a page fault value of the specific application with an average page fault value of the remaining applications and, when the page fault value of the specific application is larger than or equal to the average page fault of the remaining applications, selecting the specific application as the target application.

16. The method of claim 9, wherein the selection step comprises predicting an arithmetic intensity of a next neighboring period by performing linear regression on an arithmetic intensity calculated for each application in every period and selecting a specific application predicted to have a smallest arithmetic intensity of the next neighboring period as the target application.

* * * * *